(12) United States Patent
Nakai

(10) Patent No.: US 8,305,476 B2
(45) Date of Patent: Nov. 6, 2012

(54) DISPLAY DEVICE AND IMAGING APPARATUS FOR SWITCHING BETWEEN FIRST AND SECOND DISPLAY UNITS

(75) Inventor: Yasunori Nakai, Nara (JP)

(73) Assignee: Panasonic Corporation, Osaka (JP)

( * ) Notice: Subject to any disclaimer, the term of this patent is extended or adjusted under 35 U.S.C. 154(b) by 505 days.

(21) Appl. No.: 12/556,638

(22) Filed: Sep. 10, 2009

(65) Prior Publication Data

US 2010/0066888 A1    Mar. 18, 2010

(30) Foreign Application Priority Data

Sep. 11, 2008   (JP) ................................ 2008-233198

(51) Int. Cl.
*H04N 5/222* (2006.01)
(52) U.S. Cl. ............................... 348/333.01; 348/222.1
(58) Field of Classification Search .............. 348/333.01
See application file for complete search history.

(56) References Cited

U.S. PATENT DOCUMENTS

| | | | | |
|---|---|---|---|---|
| 6,393,222 B1* | 5/2002 | Nakagawa et al. | ........... | 396/287 |
| 2004/0169758 A1* | 9/2004 | Murashima et al. | ..... | 348/333.08 |
| 2004/0212711 A1* | 10/2004 | Stavely et al. | ........... | 348/333.03 |
| 2007/0241203 A1* | 10/2007 | Wagner et al. | ................. | 236/1 C |
| 2008/0013851 A1* | 1/2008 | Ishiwata et al. | ............... | 382/255 |
| 2008/0061929 A1* | 3/2008 | Cromer et al. | ............... | 340/5.61 |
| 2010/0066856 A1* | 3/2010 | Kishimoto et al. | ........ | 348/222.1 |

FOREIGN PATENT DOCUMENTS

JP    2004-201104 A    7/2004

* cited by examiner

*Primary Examiner* — Nicholas Giles
*Assistant Examiner* — Cynthia Segura
(74) *Attorney, Agent, or Firm* — Panasonic Patent Center

(57) ABSTRACT

A display device includes first and second display units each operable to display an image; a state detecting unit operable to detect a first state and a second state; a manipulation unit operable to be manipulated; and a control unit operable to control the first and second display units, wherein the control unit causes the first display unit to display the image when the state detecting unit detects the first state, and causes the second display unit to display the image when the state detecting unit detects the second state, the control unit switches a display unit to be activated from the first or second display unit which is displaying the image to the first or second display unit which is not displaying the image when the manipulation unit is manipulated, and the control unit causes the first or second display unit activated when the manipulation unit is manipulated to continuously display the image until the manipulation unit is manipulated again or until a change in state is detected twice by the state detecting unit.

11 Claims, 4 Drawing Sheets

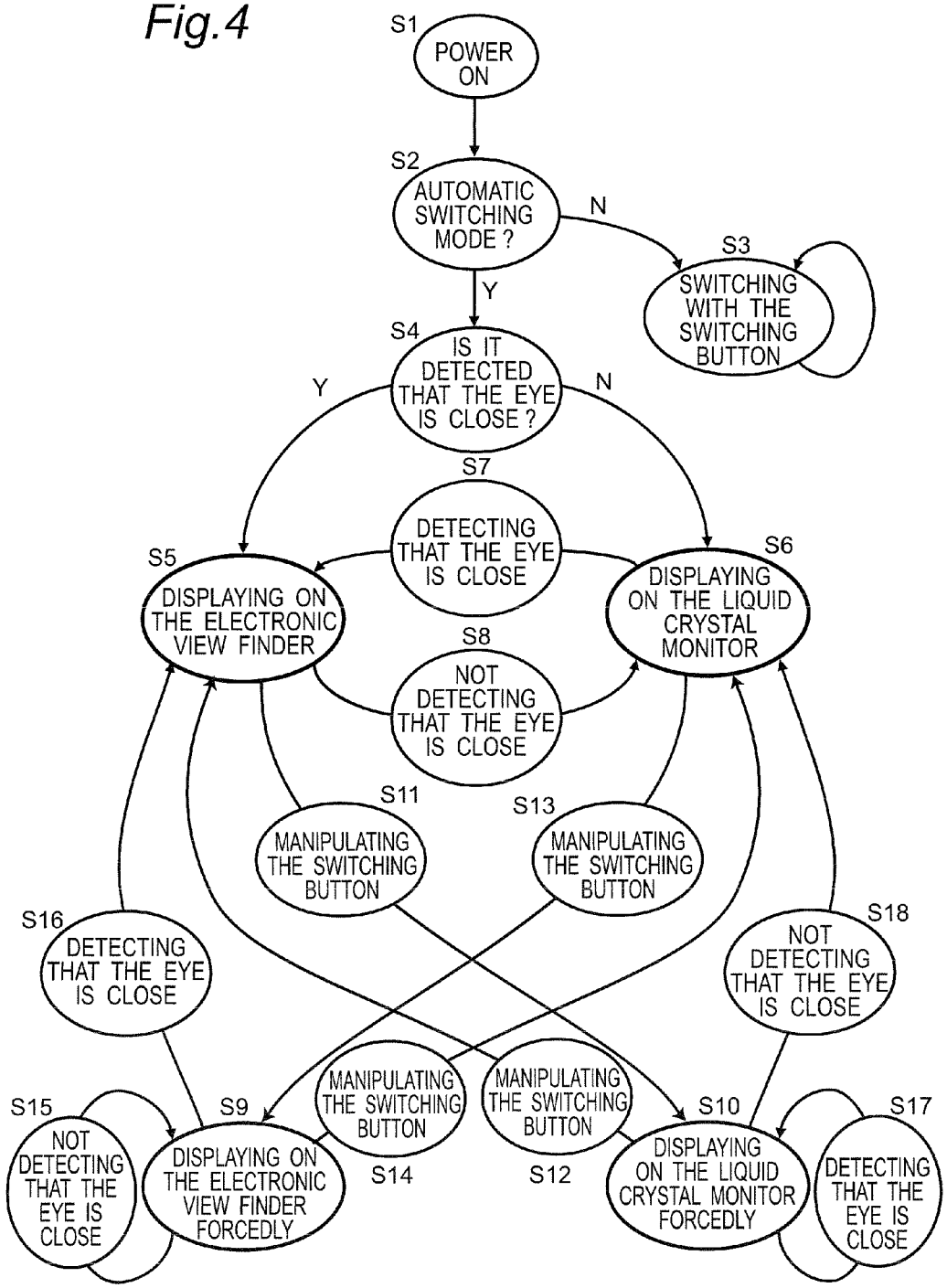

DISPLAY DEVICE AND IMAGING APPARATUS FOR SWITCHING BETWEEN FIRST AND SECOND DISPLAY UNITS

BACKGROUND

1. Technical Field

Technical field relates to a display device that displays an image and an imaging apparatus that records image data of a subject, more particularly to display device including two display units and an imaging apparatus.

2. Related Art

JP-A-2004-201104 discloses an imaging apparatus provided with a plurality of display units. The imaging apparatus of JP-A-2004-201104 includes an electronic viewfinder, a liquid crystal monitor, and a sensor that detects whether a user brings one of eyes close to a viewfinder. The imaging apparatus displays an image on a first display unit when the sensor detects that the user brings one of eyes close to a viewfinder, and the imaging apparatus displays the image on a second display unit when the sensor does not detect that the user brings one of eyes close to a viewfinder. That is, the display units are automatically switched based on the detection result of the sensor.

There is also well known an imaging apparatus that a user can switch the display mode selectively by manipulating a slide switch or a rotary switch, between a display mode in which display with the electronic viewfinder and display with a liquid crystal monitor are automatically switched according to the presence or absence of the proximity of the eye to the viewfinder, a display mode with the electronic viewfinder, and a display mode with the liquid crystal monitor.

In the imaging apparatus disclosed in JP-A-2004-201104, disadvantageously the display cannot be switched to a display unit in which the image is not displayed, when the sensor detects that the user brings one of eyes close to a viewfinder, or when the sensor does not detect that the user brings one of eyes close to a viewfinder. In the imaging apparatus including the slide switch or the rotary switch, although the display units can be switched by manipulating the switch, it is necessary to manipulate the switch every switching, which causes a problem in that the user manipulation becomes extremely troublesome.

In order to solve the problems pertaining to the display unit, an object is to provide user-friendly display device and imaging apparatus.

SUMMARY

In order to solve the above problems, a display device includes first and second display units each operable to display an image; a state detecting unit operable to detect a first state and a second state; a manipulation unit operable to be manipulated; and a control unit operable to control the first and second display units, wherein the control unit causes the first display unit to display the image when the state detecting unit detects the first state, and causes the second display unit to display the image when the state detecting unit detects the second state, the control unit switches a display unit to be activated from the first or second display unit which is displaying the image to the first or second display unit which is not displaying the image when the manipulation unit is manipulated, and the control unit causes the first or second display unit activated when the manipulation unit is manipulated to continuously display the image until the manipulation unit is manipulated again or until a change in state is detected twice by the state detecting unit.

In a first aspect, an imaging apparatus includes an imaging device operable to output an image signal of a subject; first and second display units each operable to display an image based on the image signal supplied from the imaging device; a state detecting unit operable to detect a first state and a second state; a manipulation unit operable to be manipulated; and a control unit operable to control the first and second display units, wherein the control unit causes the first display unit to display the image based on the image signal when the state detecting unit detects the first state, and causes the second display unit to display the image based on the image signal when the state detecting unit detects the second state, the control unit switches a display unit to be activated from the first or second display unit which is displaying the image based on the image signal to the first or second display unit which is not displaying the image based on the image signal when the manipulation unit is manipulated, and the control unit causes the first or second display unit activated when the manipulation unit is manipulated to continuously display the image based on the image signal until the manipulation unit is manipulated again or until a change in state is detected twice by the state detecting unit.

In a second aspect, an imaging apparatus includes a state detecting unit operable to detect a plurality of states; a manipulation unit operable to be manipulated; an automatic mode in which an operation of the imaging apparatus is switched according to the state detected by the state detecting unit; and a forced mode in which the operation of the imaging apparatus is switched to an operation corresponding to the manipulation when the manipulation unit is manipulated in the automatic mode, wherein the forced mode returns to the automatic mode when the state detecting unit detects a change in state.

According to the aforementioned arrangement, even if an image is displayed on one of the display units based on a state detected by the state detecting unit, the display unit is switched to the display unit which is not displaying the image when the manipulation unit is manipulated. Even if the display unit is switched to the display unit which is not displaying the image by manipulating the manipulation unit, the image is continuously displayed on the display unit switched when the manipulation unit is manipulated, until the manipulation unit is manipulated again, or until a change in state is detected twice by the state detecting unit. That is, the display unit is switched to the desired display unit by manipulating the manipulation unit only once when the display units are switched, and then the display unit is automatically switched to the original display unit when a change in state is detected twice by the state detecting unit. Therefore, the user-friendliness of the imaging apparatus is improved.

BRIEF DESCRIPTION OF DRAWINGS

FIG. 4 is a state transition diagram illustrating an operation of the digital camera of the embodiment.

DETAIL DESCRIPTION OF PREFERABLE EMBODIMENT

Embodiment

1. Configuration

An Exemplary embodiment will be described in detail with reference to the drawings.

Figure 1:
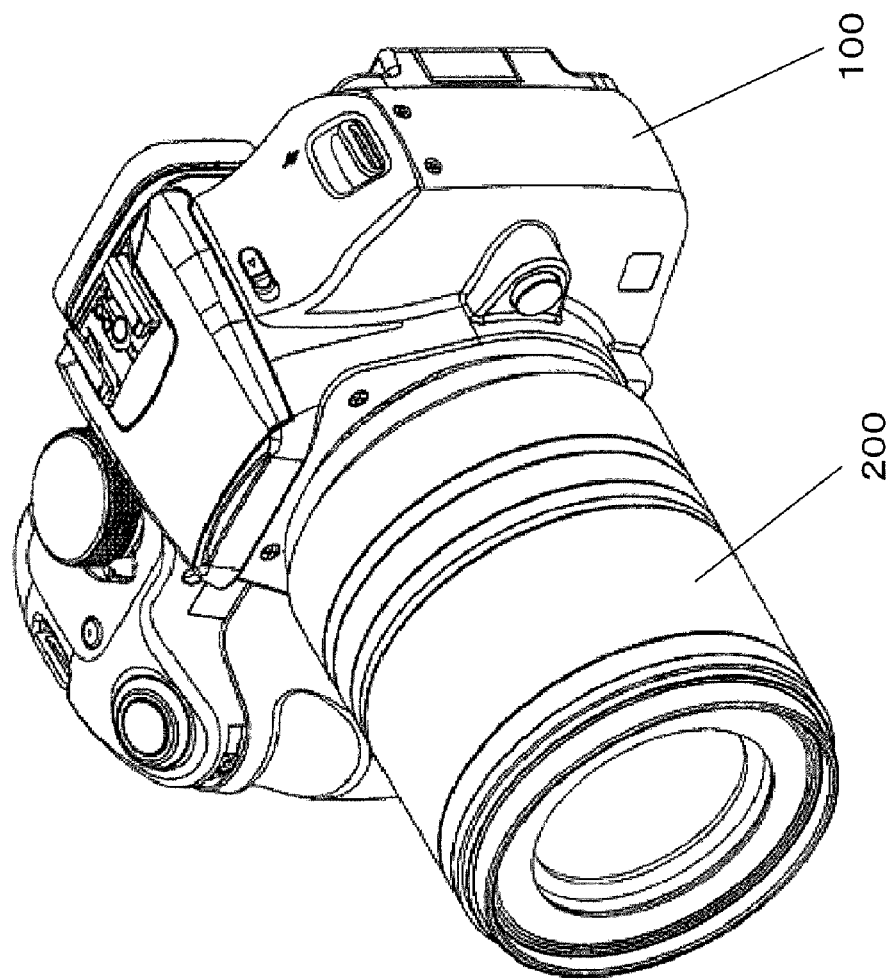
FIG. 1 is a perspective view illustrating a front face of a digital camera of an embodiment.

FIG. 1 is a perspective view illustrating a front face of a digital camera according to an embodiment. The digital camera of the embodiment includes a camera body 100 and an interchangeable lens 200 that can be attached to and detached from the camera body 100.

Figure 2:
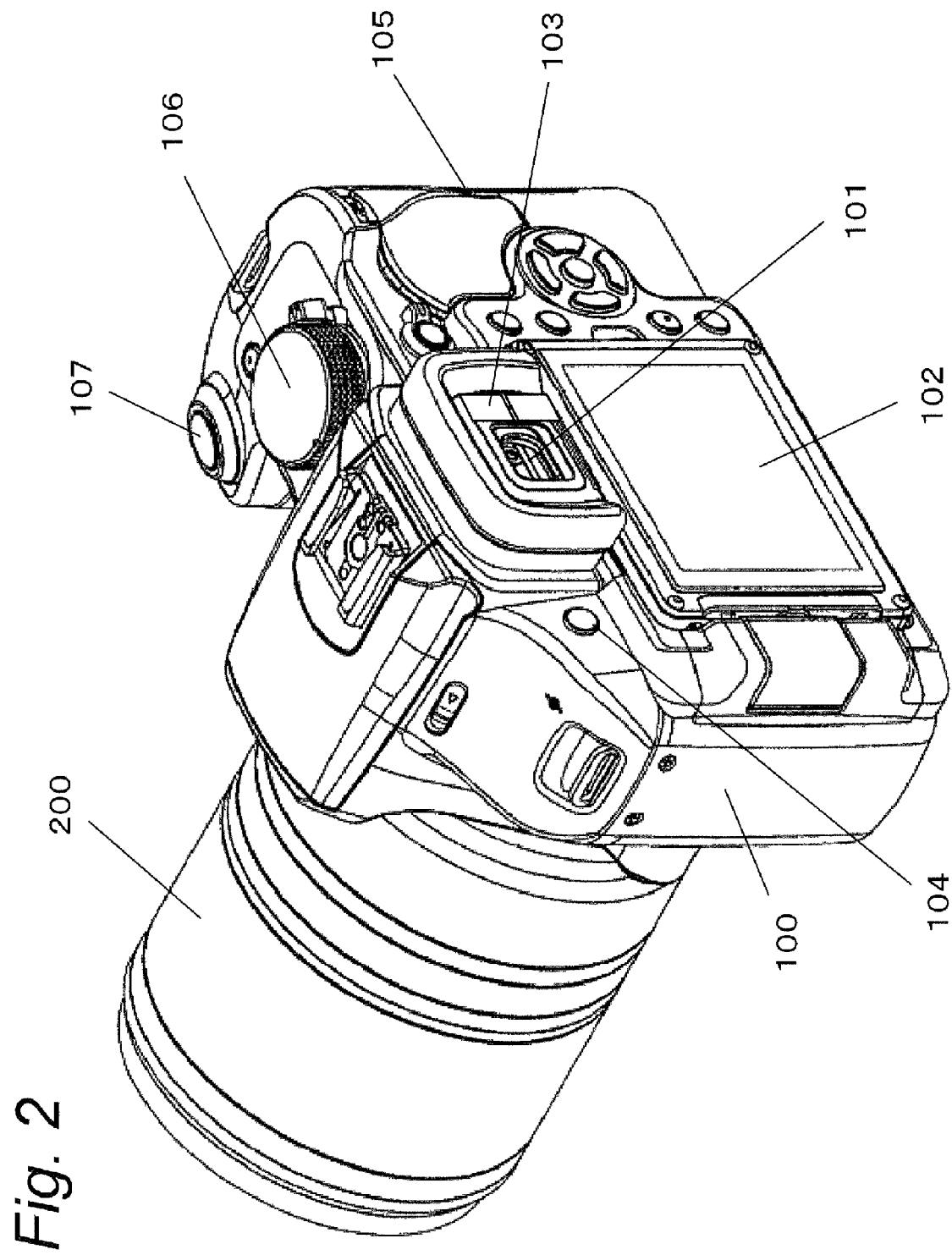
FIG. 2 is a perspective view illustrating a back face of the digital camera of the embodiment.

FIG. 2 is a perspective view illustrating a back face of the digital camera of the embodiment. The back face of the digital camera of the embodiment includes an electronic viewfinder 101 and a liquid crystal monitor 102. An eye sensor 103 is provided near the electronic viewfinder 101. A switching button 104 is provided in the upper left of the back face of the camera body 100.

Figure 3:
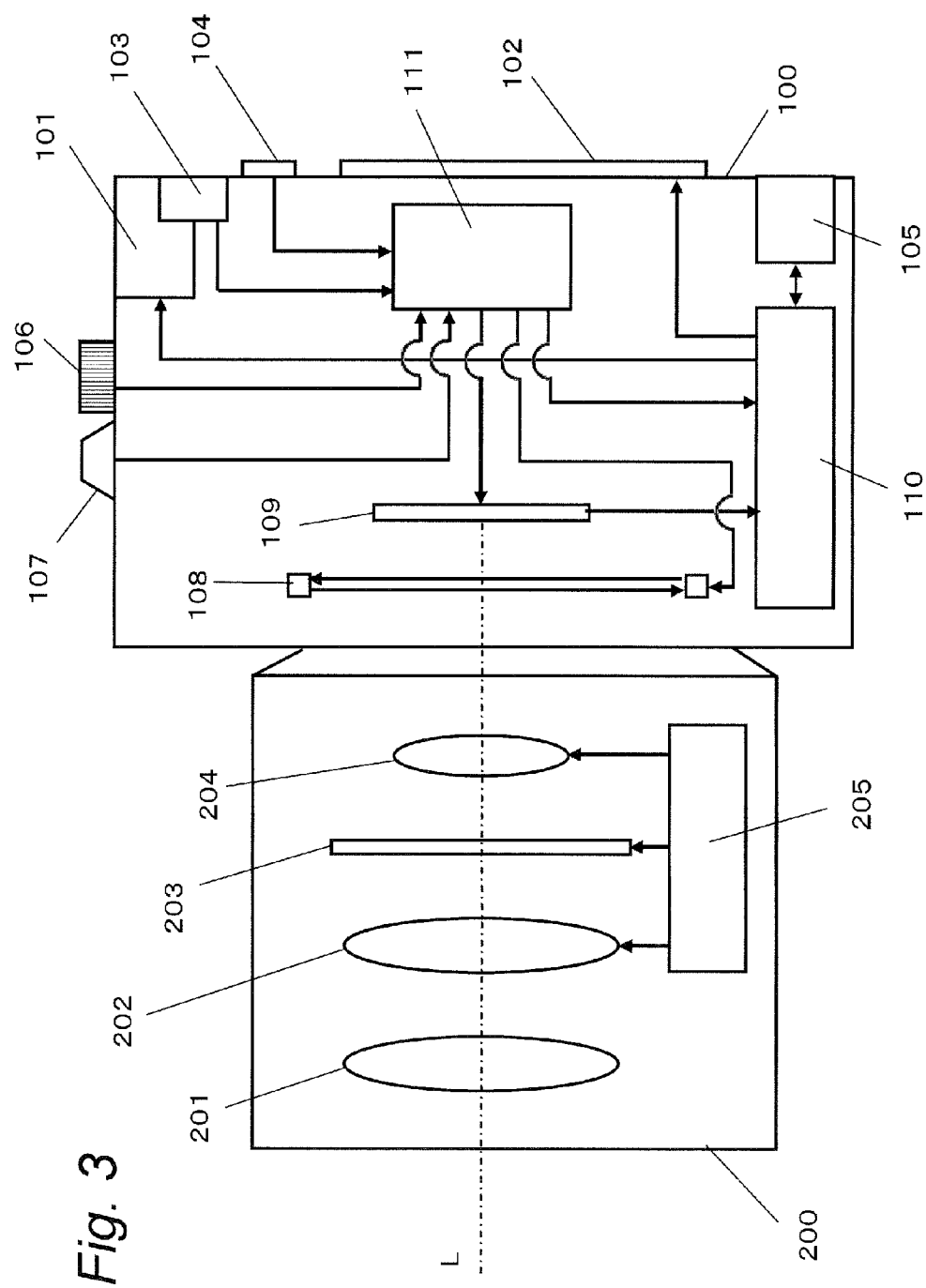
FIG. 3 is a block diagram illustrating a configuration of the digital camera of the embodiment.

FIG. 3 is a block diagram illustrating a configuration of the digital camera of the embodiment. The camera body 100 of the embodiment includes the electronic viewfinder 101, the liquid crystal monitor 102, the eye sensor 103, the switching button 104, a memory card slot 105, a mode dial 106, a release button 107, a shutter 108, an imaging device 109, a signal processing circuit 110, and a body control circuit 111.

The interchangeable lens 200 includes an objective lens 201, a zoom lens 202, an aperture mechanism 203, a focus lens 204, and a lens control circuit 205.

The zoom lens 202 proceeds and retracts along an optical axis L to change a focal distance of the interchangeable lens 200. The aperture mechanism 203 changes an opening area to change a quantity of light passing through the interchangeable lens 200. The focus lens 204 proceeds and retracts along the optical axis L to focus the light passing through the interchangeable lens 200 into the imaging device 109. The lens control circuit 205 communicates with the body control circuit 111 to control movements of the zoom lens 202, aperture mechanism 203, and focus lens 204.

The electronic viewfinder 101 is a display unit which the user visually recognizes the image (display content) by bringing one of user's eyes close to the display unit. By using the electronic viewfinder 101, the user can support the digital camera with hands and part of a face of the user, so that a composition can stably be determined.

The liquid crystal monitor 102 is a display unit with which the user can visually recognize the image (display content) even if the user does not bring one of eyes close to the viewfinder. By using the liquid crystal monitor 102, the image can visually be recognized in a relatively large screen, so that the image can easily be recognized visually even in the situation that the user hardly brings one of eyes close to the electronic viewfinder 101 like macroscopic photographing of plant with a tripod. An angle of the liquid crystal monitor 102 can be changed with respect to the camera body 100.

The eye sensor 103 is a sensor that can detect that the object (including a person) is close within a predetermined distance, and detects the state ("eye closed-in state") in which the eye of the person (user) is close to the electronic viewfinder 101.

The switching button 104 is a push switch that instantaneously establishes a conduction state when pressing manipulation is performed, and generates a trigger signal that switches between the electronic viewfinder 101 and the liquid crystal monitor 102 by the manipulation. The push switch is not expensive compared with the slide switch or the rotary switch, and installation area of the push switch is smaller than that of the slide switch or the rotary switch. From the viewpoint of user-friendliness, the switching button 104 is preferably disposed near a thumb of the left hand when the user supports the digital camera with the hands.

The mode dial 106 is a manipulating member with which the user sets an operation mode of the digital camera. The operation mode includes a photographing mode that is selected for photographing an image and a playback mode that is selected for playing back the stored image.

The body control circuit 111 monitors states of the eye sensor 103, switching button 104, mode dial 106, and release button 107, and the body control circuit 111 controls operations of the shutter 108, imaging device 109, and signal processing circuit 110. The body control circuit 111 communicates with the lens control circuit 205 to control the movement of the whole of the interchangeable lens 200. In FIG. 3, a communication path between the body control circuit 111 and the lens control circuit 205 is not illustrated.

2. Operation

Operation of the digital camera having the above configuration will be described below.

When the photographing mode is selected with the mode dial 106, the shutter 108 is in an opened state, and an exposure amount of the imaging device 109 is regulated by the aperture mechanism 203 and the electronic shutter. The interchangeable lens 200 forms a subject image on the imaging device 109. The imaging device 109 outputs an image signal corresponding to the subject image to the signal processing circuit 110. The signal processing circuit 110 performs predetermined processing to the image signal to generate a video image, and then outputs the video image to the electronic viewfinder 101 or the liquid crystal monitor 102. When the release button 107 is pressed, the shutter 108 is controlled in the opened state for a predetermined time after electric charges accumulated in the imaging device 109 are drawn. The signal processing circuit 110 records the image data, in which the predetermined processing is applied to the image signal supplied from the imaging device 109, in a memory card attached to the memory card slot 105.

On the other hand, when the playback mode is selected with the mode dial 106, the signal processing circuit 110 reads the image data stored in the memory card attached to the memory card slot 105, performs predetermined processing to the read image data to generate the video image, and then outputs the video image to the electronic viewfinder 101 or the liquid crystal monitor 102.

That is, in the embodiment, when the photographing mode is selected with the mode dial 106, the image based on the image signal corresponding to the subject image is displayed on the electronic viewfinder 101 or the liquid crystal monitor 102. On the other hand, when the playback mode is selected with the mode dial 106, the image based on the image data stored in the memory card attached to the memory card slot 105 is displayed on the electronic viewfinder 101 or the liquid crystal monitor 102. Hereinafter the image based on the image signal corresponding to the subject image or the image based on the image data stored in the memory card attached to the memory card slot 105 is simply referred to as "image" as appropriate.

The digital camera of the embodiment has an automatic switching mode as a display unit switching mode. When the automatic switching mode is selected, the image is displayed on the electronic viewfinder 101 or the eye sensor 103 according to detection results of the eye sensor 103 and switching button 104. That is, the image is displayed on the electronic viewfinder 101 when the eye sensor 103 detects that the eye is close to the electronic viewfinder 101. On the other hand, the image is displayed on the liquid crystal monitor 102 when the eye sensor 103 does not detect that the eye is close to the electronic viewfinder 101.

On the other hand, when the switching button 104 is manipulated while the image is displayed on the electronic viewfinder 101 or the liquid crystal monitor 102, despite the detection result of the eye sensor 103, the display unit to be activated is switched from the display unit which is currently displaying the image to the display unit which is not currently displaying the image. For example, when the switching button 104 is manipulated while the image is displayed on the electronic viewfinder 101, the display unit to be activated is switched to the liquid crystal monitor 102. On the other hand, when the switching button 104 is manipulated while the image is displayed on the liquid crystal monitor 102, the display unit to be activated is switched to the electronic viewfinder 101.

When the switching button 104 is manipulated to switch the display unit, the image is continuously displayed on the display unit switched when the switching button 104 is manipulated until the switching button 104 is manipulated again, or until the state detected by the eye sensor 103 is changed twice. For example, assuming that the image is displayed on the electronic viewfinder 101 while the eye sensor 103 detects that the eye is close to the electronic viewfinder 101, in a case where the switching button 104 is manipulated to switch the operated display unit to the liquid crystal monitor 102, the image is continuously displayed on the liquid crystal monitor 102 until the switching button 104 is manipulated again, or until the state in which the eye sensor 103 detects that the eye is close to the electronic viewfinder 101 is changed to the state in which the eye sensor 103 does not detect that the eye is close to the electronic viewfinder 101 and afterward the state in which the eye sensor 103 does not detect that the eye is close to the electronic viewfinder 101 is changed to the state in which the eye sensor 103 detects that the eye is close to the electronic viewfinder 101. On the other hand, assuming that the image is displayed on the liquid crystal monitor 102 while the eye sensor 103 does not detect that the eye is close to the electronic viewfinder 101, in a case where the switching button 104 is manipulated to switch the display unit to be activated to the electronic viewfinder 101, the image is continuously displayed on the electronic viewfinder 101 until the switching button 104 is manipulated again, or until the state in which the eye sensor 103 does not detect that the eye is close to the electronic viewfinder 101 is changed to the state in which the eye sensor 103 detects that the eye is close to the electronic viewfinder 101 and afterward the state in which the eye sensor 103 detects that the eye is close to the electronic viewfinder 101 is changed to the state in which the eye sensor 103 does not detect that the eye is close to the electronic viewfinder 101.

With this arrangement, when the display unit is forcedly changed to the display unit that does not correspond to the state detected by the eye sensor 103 by manipulating the switching button 104, the display unit can be prevented from returning to the display unit corresponding to the state detected by the eye sensor 103. Furthermore, effect of the forced switching of the display unit with the switching button 104 is lost when the eye sensor 103 detects the change in state twice. For example, when the switching button 104 is manipulated to switch the activated display unit to the liquid crystal monitor 102 while the user visually recognizes the subject through the electronic viewfinder 101, and then the user distances the eye from the electronic viewfinder 101 to visually recognize the subject through the liquid crystal monitor 102, the image is displayed on the liquid crystal monitor 102. Then, when the user brings the eye close to the electronic viewfinder 101 again, the display units are switched so that the image is displayed on the electronic viewfinder 101. On the other hand, when the switching button 104 is manipulated to switch the activated display unit to the electronic viewfinder 101 while the user visually recognizes the subject through the liquid crystal monitor 102 and then the user brings the eye close to the electronic viewfinder 101 to visually recognize the subject through the electronic viewfinder 101, the image is displayed on the electronic viewfinder 101. Then, when the user distances the eye from the electronic viewfinder 101, the display units are switched so that the image is displayed on the liquid crystal monitor 102.

The electronic viewfinder 101 is an example of the first display unit, and the liquid crystal monitor 102 is an example of the second display unit. The eye sensor 103 is an example of the state detecting unit, and the switching button 104 is an example of the manipulation unit. The memory card slot 105 is an example of the recording unit. The body control circuit 111 is an example of the control unit.

FIG. 4 is a state transition diagram illustrating an operation of the digital camera of the embodiment.

When the digital camera is powered on (S1), the body control circuit 111 confirms whether the automatic switching mode of the display unit is set (S2). The automatic switching mode of the display unit can be set with a button (not illustrated). The automatic switching mode of the display unit can be set with set-up-menu by software, not with a physical architecture such a button.

When the automatic switching mode of the display unit is not set, the display of the electronic viewfinder 101 and the display of the liquid crystal monitor 102 can be switched with the switching button 104 (S3). At this point, it is not considered whether the eye sensor 103 detects that the eye is close to the electronic viewfinder 101, and the display of the electronic viewfinder 101 and the display of the liquid crystal monitor 102 are not automatically switched based on whether the eye sensor 103 detects that the eye is close to the electronic viewfinder 101.

On the other hand, when the automatic switching mode of the display unit is set, the state of the eye sensor 103 is confirmed (S4). When the eye sensor 103 detects that the eye is close to the electronic viewfinder 101, the image is displayed on the electronic viewfinder 101 (S5). When the eye sensor 103 does not detect that the eye is close to the electronic viewfinder 101, the image is displayed on the liquid crystal monitor 102 (S6). A state (S5) of "display of electronic viewfinder 101" and a state (S6) of "display of liquid crystal monitor" are switched every time the state detected by the eye sensor 103 is changed (S7 and S8).

In the state (S5) of "display of electronic viewfinder 101", when the switching button 104 is manipulated (S11), the state (S5) of "display of electronic viewfinder 101" makes the transition to a state (S10) of "forced display of liquid crystal monitor 102" such that the image is displayed on the liquid crystal monitor 102. In the state (S10) of "forced display of liquid crystal monitor 102", when the switching button 104 is manipulated (S12), the state (S10) of "forced display of liquid crystal monitor 102" makes the transition to the state (S5) of "display of electronic viewfinder 101" such that the image is displayed on the electronic viewfinder 101.

In the state (S6) of "display of liquid crystal monitor", when the switching button 104 is manipulated (S13), the state (S6) of "display of liquid crystal monitor" shifts to a state (S9) of "forced display of electronic viewfinder 101" such that the image is displayed on the electronic viewfinder 101. On the other hand, in the state (S9) of "forced display of electronic viewfinder 101", when the switching button 104 is manipulated (S14), the state (S9) of "forced display of electronic viewfinder 101" shifts to the state (S6) of "display of liquid crystal monitor 102" such that the image is displayed on the liquid crystal monitor 102.

In the state (S9) of "forced display of electronic viewfinder 101", when the eye sensor 103 does not detect that the eye is close to the electronic viewfinder 101 (S15), the image is continuously displayed on the electronic viewfinder 101. When the eye sensor 103 detects that the eye is close to the electronic viewfinder 101 (S16), the state (S9) of "forced display of electronic viewfinder 101" shifts to the state (S5) of "display of electronic viewfinder 101". At this time, the image is continuously displayed on the electronic viewfinder 101, and thus the activated display unit is not changed apparently. However, the first change occurs in the state detected by the eye sensor 103, from the state in which the eye sensor 103 does not detect that the eye is close to the electronic viewfinder 101 to the state in which the eye sensor 103 detects that the eye is close to the electronic viewfinder 101. In the state (S5) of "display of electronic viewfinder 101", when the eye sensor 103 does not detect that the eye is close to the electronic viewfinder 101 (S8), the state (S5) of "display of electronic viewfinder 101" shifts to the state (S6) of "display of liquid crystal monitor 102", so that the image is displayed on the liquid crystal monitor 102. At this time, the second change occurs in the state detected by the eye sensor 103, from the state in which the eye sensor 103 detects that the eye is close to the electronic viewfinder 101 to the state in which the eye sensor 103 does not detect that the eye is close to the electronic viewfinder 101.

On the other hand, in the state (S10) of "forced display of liquid crystal monitor 102", while the eye sensor 103 detects that the eye is close to the electronic viewfinder 101 (S17), the image is continuously displayed on the liquid crystal monitor 102. When the eye sensor 103 does not detect that the eye is close to the electronic viewfinder 101 (S18), the state (S10) of "forced display of liquid crystal monitor 102" shifts to the state (S6) of "display of liquid crystal monitor 102". At that time, the image is continuously displayed on the liquid crystal monitor 102, and thus the activated display unit is not changed apparently. However, the first change occurs in the state detected by the eye sensor 103, from the state in which the eye sensor 103 detects that the eye is close to the electronic viewfinder 101 to the state in which the eye sensor 103 does not detect that the eye is close to the electronic viewfinder 101. In the state (S6) of "display of liquid crystal monitor", when the eye sensor 103 detects that the eye is close to the electronic viewfinder 101 (S7), the state (S6) of "display of liquid crystal monitor" shifts to the state (S5) of "display of electronic viewfinder 101", so that the image is displayed on the electronic viewfinder 101. At this time, the second change occurs in the state detected by the eye sensor 103, from the state in which the eye sensor 103 does not detect that the eye is close to the electronic viewfinder 101 to the state in which the eye sensor 103 detects that the eye is close to the electronic viewfinder 101.

Thus, in the state (S9) of "forced display of electronic viewfinder 101" or the state (S10) of "forced display of liquid crystal monitor 102", the body control circuit 111 performs the control such that the image is continuously displayed on the electronic viewfinder 101 or the liquid crystal monitor 102 until the switching button 104 is manipulated again, or until the state detected by the eye sensor 103 is changed twice.

The state (S5) of "display of electronic viewfinder 101" and the state (S6) of "display of liquid crystal monitor" are examples of the automatic mode. The state (S9) of "forced display of electronic viewfinder 101" and the state (S10) of "forced display of liquid crystal monitor 102" are examples of the forced mode. That is, in the state (S9) of "forced display of electronic viewfinder 101" that is of the forced mode, when the state detected by the eye sensor 103 is changed from the state in which the eye sensor 103 does not detect that the eye is close to the electronic viewfinder 101 to the state in which the eye sensor 103 detects that the eye is close to the electronic viewfinder 101, the state (S9) of "forced display of electronic viewfinder 101" returns to the state (S5) of "display of electronic viewfinder 101" that is of the automatic mode. On the other hand, in the state (S10) of "forced display of liquid crystal monitor 102" that is of the forced mode, when the state detected by the eye sensor 103 is changed from the state in which the eye sensor 103 detects that the eye is close to the electronic viewfinder 101 to the state in which the eye sensor 103 does not detect that the eye is close to the electronic viewfinder 101, the state (S10) of "forced display of liquid crystal monitor 102" returns to the state (S6) of "display of liquid crystal monitor" that is of the automatic mode.

3. Summary

As described above, in the digital camera of the embodiment, even if the image is displayed on one of the display units of the electronic viewfinder 101 and liquid crystal monitor 102 based on the state detected by the eye sensor 103, the display unit is forcedly switched to the display unit which is not displaying the image when the switching button 104 is manipulated. When the display unit is forcedly switched by manipulating the switching button 104, the image is continuously displayed on the switched display unit until the switching button 104 is manipulated again, or until the change in state is detected twice by the eye sensor 103. That is, the display units can forcedly be switched even if the automatic switching mode is selected, and the display unit can be switched to the desired display unit by manipulating the switching button 104 only once when the display units are desired to be tentatively switched forcedly. Then, when the change in state is detected twice by the eye sensor 103, the display unit returns automatically to the original display unit. Such switching of the display units allows the user-friendliness of the digital camera to be improved.

One example in which the display unit is desired to be forcedly switched in the automatic switching mode is shown below. For example, while the image is confirmed with the liquid crystal monitor 102, when a strap used to put the digital camera around the user's shoulder is close within a predetermined distance of the eye sensor 103, the eye sensor 103 may wrongly detect that the user brings the eye close to the electronic viewfinder 101, thereby switching the display unit to the electronic viewfinder 101. In such cases, even in the automatic switching mode, the display unit for displaying the image can tentatively be forcedly switched to the liquid crystal monitor 102 by manipulating the switching button 104. For example, when the user views the image with a movable liquid crystal monitor 102 moved to a desired position, the liquid crystal monitor 102 or the strap may happen to be disposed near the eye sensor 103. In such cases, when the digital camera is set to the automatic switching mode, the eye sensor 103 wrongly detects the liquid crystal monitor 103, so that the display unit may be automatically switched to the electronic viewfinder 101. In this case, according to the display unit switching method of the embodiment, the display unit can easily be switched to the liquid crystal monitor 102 to improve the user-friendliness.

4. Other Embodiments

Although the interchangeable lens type digital camera is described in the embodiment, the embodiment is not limited to the interchangeable lens type digital camera. It may be applied to a camera of which lens is not interchanged. Generally it may be applied to a display device provided with two display units.

In the embodiment, the electronic viewfinder 101 is used as the first display unit while the liquid crystal monitor 102 is used as the second display unit. However, the display unit is not limited to the embodiment. Any display unit may be used as the first display unit and the second display unit.

In the embodiment, the eye sensor 103 is used as the state detecting unit. However, the state detecting unit is not limited to the eye sensor 103. A simple proximity sensor may be used as the state detecting unit. Generally a state detecting unit that can detect the two states may be used as state detecting unit.

In the embodiment, the memory card slot 105 is used as the recording unit. However, the recording unit is not limited to the memory card slot 105. Any recording unit in which the image data can be stored may be used as the recording unit.

In the embodiment, the electronic viewfinder 101 and the liquid crystal monitor 102 are switched. However, the embodiment is not limited to this arrangement. An imaging apparatus may be used, which is configured to return to the mode by changing the state detected by the state detecting unit when the manipulation unit switches the automatic mode to the forced mode. For example, it is assumed that, in an imaging apparatus having the function of recognizing the photographing target and automatically performing the setting according to the photographing target, the imaging apparatus recognizes that the photographing target is a person. At this case, even if the setting is forcedly switched to that for the photographing target which is a landscape, when the imaging apparatus recognizes change in the photographing target, the imaging apparatus may recognize the photographing target and return to the state in which the setting is automatically performed according to the photographing target.

Industrial Applicability

In the embodiment, even if the display unit is switched to the display unit which is not displaying the image by manipulating the manipulation unit, the image is continuously displayed on the display unit switched when the manipulation unit is manipulated, until the manipulation unit is manipulated again or until the change in state is detected twice by the state detecting unit, so that the display device and imaging apparatus having the excellent user-friendliness can be provided. Accordingly, it is suitably applied to the display device and imaging apparatus having a plurality of display units.

What is claimed is:

1. A display device comprising:
first and second display units each operable to display an image;
a state detecting unit operable to detect a first state and a second state;
a manipulation unit operable to be manipulated; and
a control unit operable to control the first and second display units, wherein
the control unit is operable to control the first and second display units depending on the state detected by the state detecting unit to cause the first display unit to display the image when the state detecting unit detects the first state, and to cause the second display unit to display the image when the state detecting unit detects the second state,
the control unit switches a display unit to be activated from the first or second display unit which is displaying the image to the first or second display unit which is not displaying the image when the manipulation unit is manipulated, and
when the first or second display unit which is displaying the image has been forcedly activated by a previous manipulation of the manipulation unit regardless of the state detected by the state detecting unit, the control unit causes the first or second display unit which has been forcedly activated to continuously display the image until a change in state is detected twice by the state detecting unit.

2. The display device according to claim 1, wherein the state detecting unit is a sensor that can detect a person or an object is close within a predetermined distance.

3. The display device according to claim 1, wherein the first display unit is a display unit on which a user can visually recognize a display content by bringing one of eyes of the user close to the display unit, and
the second display unit is a display unit on which the user can visually recognize the display content without bringing one of eyes of the user close to the display unit.

4. The display device according to claim 1, further comprising a recording unit which stores image data,
wherein the first and second display units can display images based on the image data stored in the recording unit.

5. The display device according to claim 1, wherein the manipulation unit is a push switch.

6. An imaging apparatus comprising:
an imaging device operable to output an image signal of a subject;
first and second display units each operable to display an image based on the image signal supplied from the imaging device;
a state detecting unit operable to detect a first state and a second state;
a manipulation unit operable to be manipulated; and
a control unit operable to control the first and second display units, wherein
the control unit is operable to control the first and second display units depending on the state detected by the state detecting unit to cause the first display unit to display the image based on the image signal when the state detecting unit detects the first state, and to cause the second display unit to display the image based on the image signal when the state detecting unit detects the second state,
the control unit switches a display unit to be activated from the first or second display unit which is displaying the image based on the image signal to the first or second display unit which is not displaying the image based on the image signal when the manipulation unit is manipulated, and
when the first or second display unit which is displaying the image has been forcedly activated by a previous manipulation of the manipulation unit regardless of the state detected by the state detecting unit, the control unit causes the first or second display unit which has been forcedly activated to continuously display the image based on the image signal until a change in state is detected twice by the state detecting unit.

7. The imaging apparatus according to claim 6, wherein the state detecting unit is a sensor that can detect a person or an object is close within a predetermined distance.

8. The imaging apparatus according to claim 6, wherein the first display unit is a display unit on which a user can visually recognize a display content by bringing one of eyes of the user close to the display unit, and
the second display unit is a display unit on which the user can visually recognize the display contents without bringing one of eyes of the user close to the display unit.

9. The imaging apparatus according to claim 6, further comprising a recording unit which stores image data based on the image signal, wherein the first and second display units can display the images based on the image data stored in the recording unit.

10. The imaging apparatus according to claim 6, wherein the manipulation unit is a push switch.

11. An imaging apparatus comprising:

a state detecting unit operable to detect a plurality of states;

first and second display units each operable to display an image;

a manipulation unit operable to be manipulated;

an automatic mode in which a display unit to be activated between the first or second display unit is switched according to the state detected by the state detecting unit; and a forced mode in which the display unit to be activated is switched to the first or second display unit corresponding to the manipulation when the manipulation unit is manipulated in the automatic mode, wherein the forced mode returns to the automatic mode without changing the display unit to be activated when the state detecting unit detects a change in state.

* * * * *